(12) United States Patent
Kogon

(10) Patent No.: US 12,145,896 B2
(45) Date of Patent: Nov. 19, 2024

(54) SYSTEMS AND METHODS FOR SEPARATING A MIXTURE OF COMPRESSED-GAS SOLVENTS

(71) Applicant: Bizzybee LLC, Tacoma, WA (US)

(72) Inventor: Boris David Kogon, Seattle, WA (US)

(73) Assignee: Bizzybee LLC, Tacoma, WA (US)

( * ) Notice: Subject to any disclaimer, the term of this patent is extended or adjusted under 35 U.S.C. 154(b) by 0 days.

(21) Appl. No.: 18/133,495

(22) Filed: Apr. 11, 2023

(65) Prior Publication Data

US 2023/0324116 A1 Oct. 12, 2023

Related U.S. Application Data

(60) Provisional application No. 63/329,815, filed on Apr. 11, 2022.

(51) Int. Cl.
*B01D 53/00* (2006.01)
*C07B 63/00* (2006.01)

(52) U.S. Cl.
CPC ............ *C07B 63/00* (2013.01); *B01D 53/002* (2013.01); *F25J 2205/02* (2013.01); *F25J 2290/12* (2013.01)

(58) Field of Classification Search
CPC .... C07B 63/00; B01D 53/002; F25J 2205/02; F25J 2290/12; C10G 5/06
See application file for complete search history.

(56) References Cited

U.S. PATENT DOCUMENTS

| | | | |
|---|---|---|---|
| 3,718,581 A | 2/1973 | Kleinpeter | |
| 5,806,339 A * | 9/1998 | Manley | .................. F25J 3/0209 62/631 |
| 10,315,130 B2 | 6/2019 | Kogon | |
| 10,544,077 B2 | 1/2020 | Barnicki et al. | |
| 2009/0194460 A1* | 8/2009 | Klein Nagul Voort | ...................... F25J 3/0209 422/255 |
| 2015/0052941 A1 | 2/2015 | King et al. | |
| 2018/0051215 A1* | 2/2018 | Bauer | ................... F25J 3/0209 |
| 2018/0120278 A1 | 5/2018 | Hoorfar et al. | |

(Continued)

OTHER PUBLICATIONS

International Search Report and Written Opinion of the International Searching Authority in International Patent Application No. PCT/US23/18218, 18 pages.

*Primary Examiner* — Dung H Bui
(74) *Attorney, Agent, or Firm* — Benedict R. Dugan; Lowe Graham Jones PLLC

(57) ABSTRACT

Techniques and systems for separating components of a mixture of compressed gases each having different boiling points are described. One example system includes multiple recovery stages that each recover one of the gases by condensing it into liquid form. The recovery stages are chained together, such that each stage recovers a gas having a boiling point that is higher than those of the gases to be recovered in downstream stages. Each stage typically includes a warming element that is fluidly coupled to a condenser element that provides a surface cooled to a temperature low enough to condense one of the gases, but high enough such that the remaining gases remain in gaseous form. The system may include an initial evaporator stage that heats a liquid solution of phytochemical extracts and multiple solvents, thereby recovering the extracts and producing the mixture of gaseous solvents.

7 Claims, 7 Drawing Sheets

(56) References Cited

U.S. PATENT DOCUMENTS

| | | | |
|---|---|---|---|
| 2019/0352240 A1* | 11/2019 | Jo | B01D 53/04 |
| 2020/0269006 A1 | 8/2020 | Burgess et al. | |
| 2022/0128272 A1* | 4/2022 | Lantz | F25B 1/10 |

* cited by examiner

SYSTEMS AND METHODS FOR SEPARATING A MIXTURE OF COMPRESSED-GAS SOLVENTS

CROSS-REFERENCE TO RELATED APPLICATIONS

This application claims the benefit of priority from U.S. Provisional Patent Application No. 63/329,815, entitled "SOLVENT DEPRESSURIZATION DEVICES, SYSTEM, AND METHODS," filed on Apr. 11, 2022, the entire content of which is incorporated herein by reference in its entirety.

TECHNICAL FIELD

The present disclosure relates to systems and methods for separating components of a mixture of substances, and more particularly, a mixture of compressed gases having different boiling points.

DETAILED DESCRIPTION

Figure 1A:
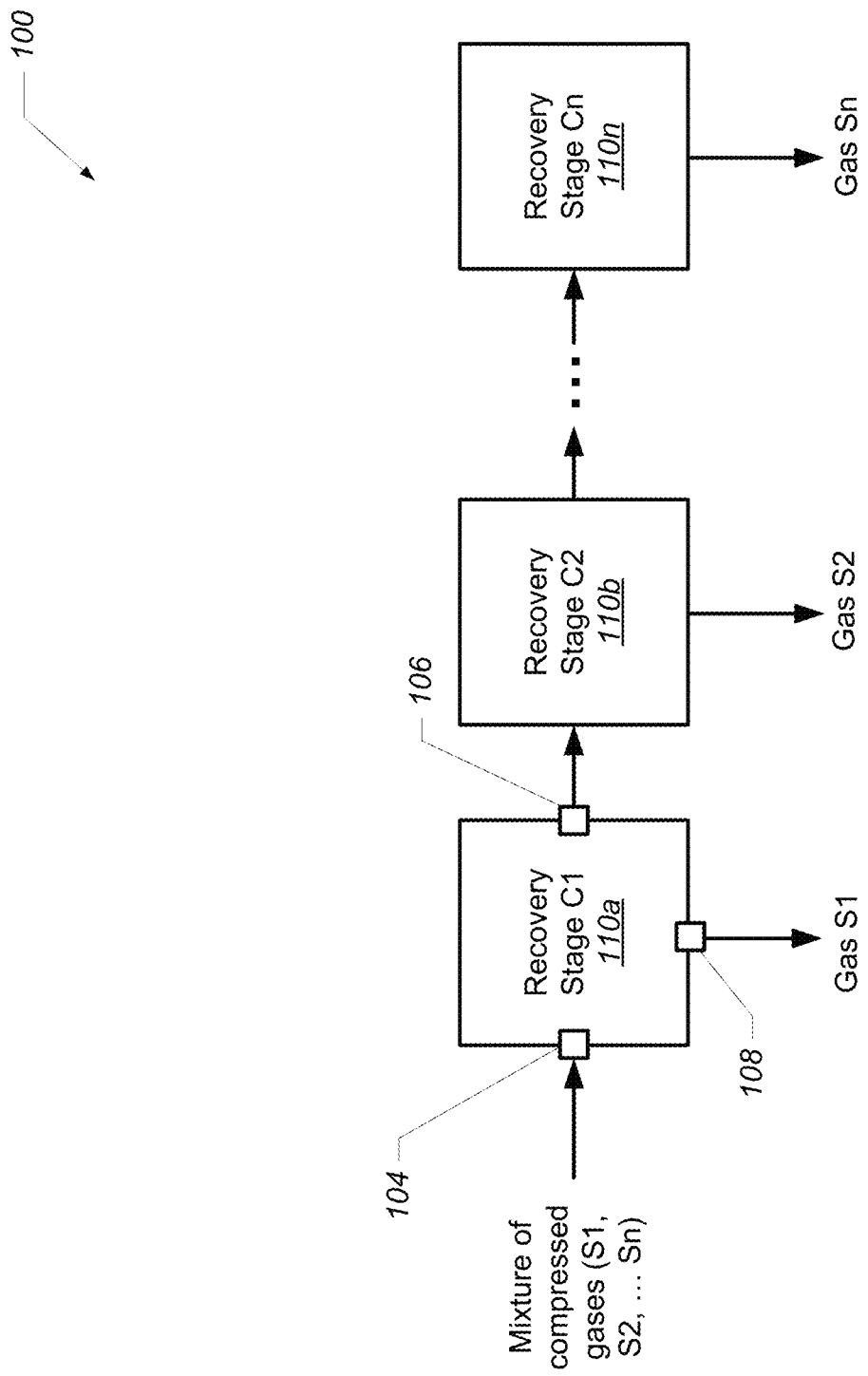
FIGS. 1A and 1B are block diagrams that illustrate the functional components of separation systems according to example embodiments.

FIG. 1A is a functional block diagram of a separation system 100 according to one embodiment. The system 100 is configured to separate a mixture of compressed gases each having a different boiling point. The system 100 includes one or more recovery stages 110a-110n. The recovery stages 110a-110n are for ease of reference also respectively labeled C1, C2, . . . Cn. Each stage in the system includes an input port, output port, and recovery port. For example, recovery stage 110a includes an input port 104, output port 106, and recovery port 108. With the exception of the final stage Cn, each output port of a stage is fluidly coupled to the input port of subsequent (downstream) stage.

Initially, a mixture of compressed gases is introduced into recovery stage 111a via the input port 104. The mixture comprises multiple compressed gases $S_1, S_2, \ldots S_n$. Each gas $S_i$ has a corresponding boiling point $T_i$ that is less than $T_{i-1}$ and greater than $T_{i+1}$. Put another way, the gases are for descriptive purposes denoted in decreasing order by boiling point, such that gas $S_1$ has the highest boiling point and gas $S_n$ has the lowest boiling point.

The gases $S_1 \ldots S_n$, pass through the recovery stages C1 . . . Cn, with each gas being recovered at a corresponding recovery stage. In this example, recovery stage $C_1$ receives the gases $S_1 \ldots S_n$ via its input port 104. Recovery stage C1 chills the received gases to a temperature that causes gas $S_1$ to condense into liquid form while allowing gases $S_2 \ldots S_n$ to remain in gaseous form. More formally, each recovery stage $C_i$ chills its received mixture of gases to a temperature T that is less than the boiling point $T_i$ of gas $S_i$ and greater than the boiling point $T_{i+1}$ of gas $S_{i+1}$. Liquid $S_1$ is recovered via the recovery port 108 of stage C1 while gases $S_2 \ldots S_n$ pass onwards to stage C2 in gaseous form.

Recovery stage C2 receives the gases $S_2 \ldots S_n$ from the output port 106 of stage C1. Recovery stage C2 chills the received gases at a temperature that causes gas $S_2$ to condense into liquid form while allowing gases $S_3 \ldots S_n$ to remain in gaseous form. Liquid $S_2$ is recovered via the recovery port of stage C2 while remaining gases $S_3 \ldots S_n$ pass onwards in gaseous form to stage C3 and thence onwards through the remainder of the system, where each gas $S_i$ is recovered at its corresponding recovery stage $C_i$.

Figure 1B:
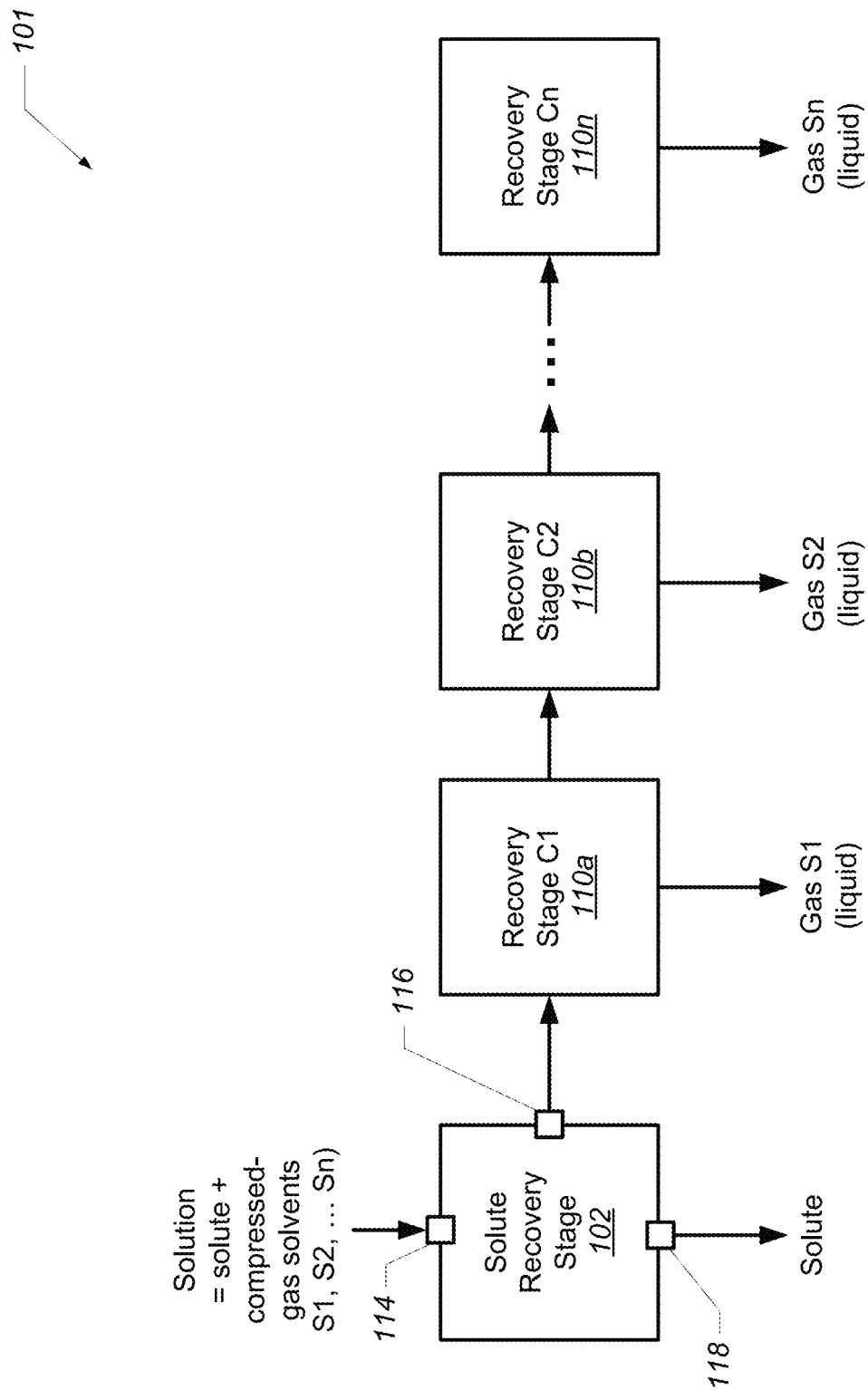

FIG. 1B is a functional block diagram of a separation system 101 according to another embodiment. The system 101 is configured to separate a mixture of compressed gases each having a different boiling point. In typical applications, the system 101 is configured to separate and recover the components of a solution that is initially introduced in liquid form. The system 101 includes a solute recovery stage 102 and one or more compressed-gas solvent recovery stages 110a-110n. The gas recovery stages 110a-110n are for ease of reference also respectively labeled C1, C2, . . . Cn. As in FIG. 1A, each stage in the system includes an input port, output port, and recovery port. For example, solute recovery stage 102 includes an input port 114, output port 116, and recovery port 118. With the exception of the final stage Cn, each output port of a stage is fluidly coupled to the input port of subsequent (downstream) stage.

Initially, a solution in liquid form is introduced into solute recovery stage 102 via the input port 114. The solution comprises a solute and one or more compressed-gas solvents $S_1, S_2, \ldots S_n$ in liquid form. Each gas $S_i$ has a corresponding boiling point $T_i$ that is less than $T_{i-1}$ and greater than $T_{i+1}$. Put another way, the gases are for descriptive purposes denoted in decreasing order by boiling point, such that gas $S_1$ has the highest boiling point and gas $S_n$ has the lowest boiling point.

The solute recovery stage 102 heats the received solution. A sufficient amount of heat is added to boil the compressed-gas solvents while retaining the solute in liquid form. Stage 102 thus operates as an evaporator. More formally, the solution is heated to a temperature T, where T is less than the boiling point of the solute but greater than the boiling point of each of the compressed-gas solvents. The gases $S_1 \ldots S_n$ in gaseous form pass onwards to recovery stage $C_1$ via the output port 116, while the solute is recovered via the recovery port 118.

As described with respect to FIG. 1A, the gases $S_1 \ldots S_n$, pass through the recovery stages C1 . . . Cn, each gas being recovered at a corresponding recovery stage. In this example, recovery stage C1 receives the gases $S_1 \ldots S_n$ from the solute recovery stage 102. Gas recovery stage C1 chills the received gases to a temperature that causes gas $S_1$ to condense into liquid form for recovery, while allowing gases $S_2 \ldots S_n$ to remain in gaseous form and pass onward to stage C2. Stage C2, in turn chills gases $S_2 \ldots S_n$ to a temperature that causes gas $S_2$ to condense into liquid form for recovery. Gases $S_3 \ldots S_n$ continue onwards down the line, each gas $S_i$ being recovered at a corresponding stage Ci.

Figure 2:
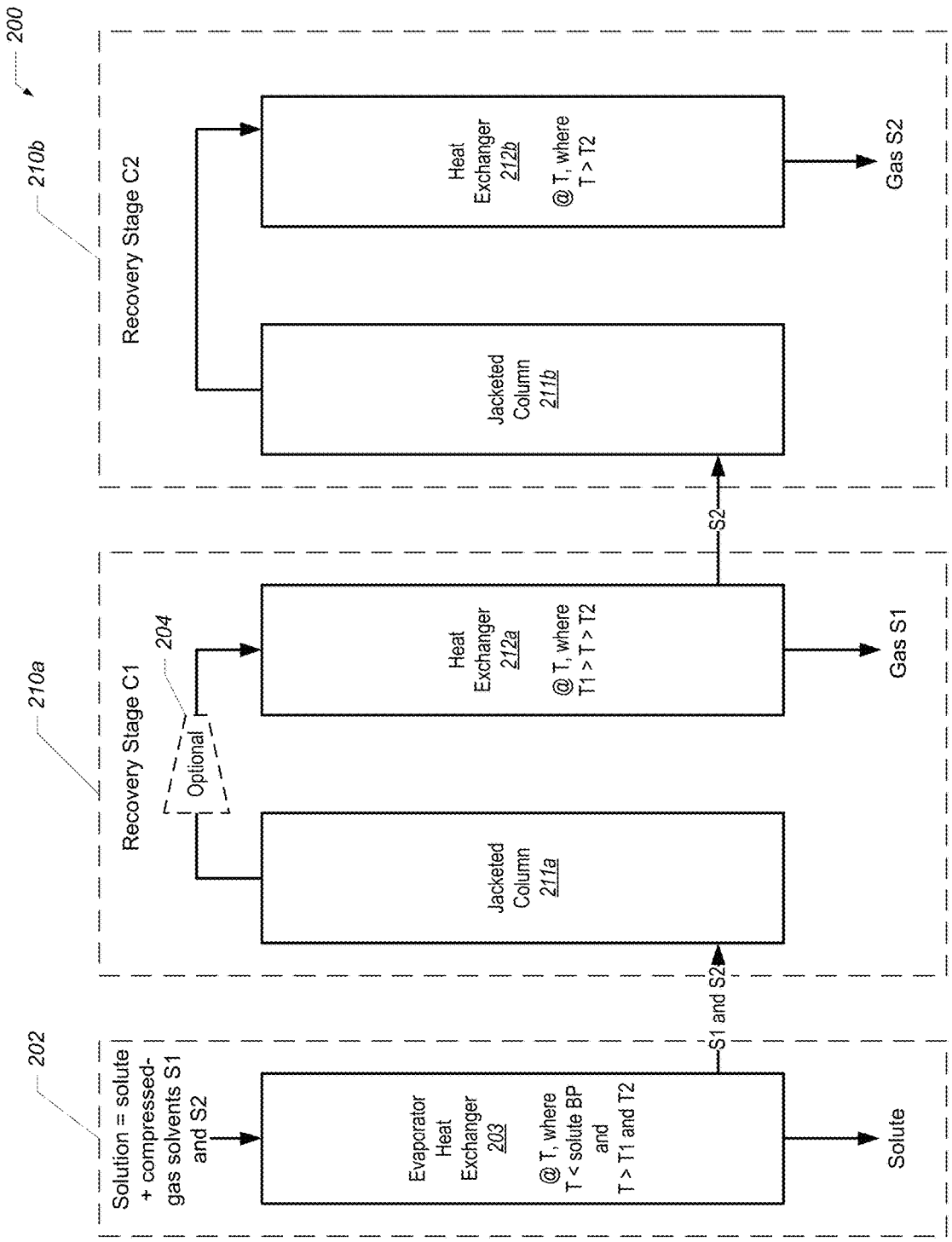
FIG. 2 is a block diagram that illustrates components used in one implementation of the described separation system.

FIG. 2 is a block diagram that that illustrates components used in one implementation of the described separation system. More specifically, FIG. 2 shows a separation system 200 that includes a solute recovery stage 202 and compressed-gas solvent recovery stages 210a and 210b (C1 and C2). A solution in liquid form comprising a solute, compressed-gas solvent S1 and compressed-gas solvent S2 introduced into the solute recovery stage 202. Gases S1 and S2 have corresponding boiling points of T1 and T2, where T1 is greater than T2.

The solute recovery stage 202 includes a heat exchanger 203 that heats the solution to a temperature T, where T is less than the boiling point of the solute but greater than the boiling points of all the gases. The solute is recovered in liquid form while the gases pass in gaseous form to recovery stage C1. A heat exchanger is any device or system that can exchange heat between two fluids. Preferably, a falling film evaporator including a tube and shell heat exchanger is employed, although the use of other types of heat exchangers is contemplated, including tube in tube, plate and shell, finned tube, or the like. An example tube and shell heat exchanger is illustrated and described with reference to FIG. 4, below.

The recovery stage C1 includes a jacketed column 211a and a heat exchanger 212a. The jacketed column 211a heats the received mixture of gases S1 and S2 from the heat exchanger 203. Heating the mixture at a temperature that is above the boiling point of S1 reduces reflux in the system 200.

A jacketed column is a tubular column having an inner vessel surrounded by an outer vessel, which forms a jacket around the inner vessel. The inner vessel and jacket form non-connected spaces, which are independently accessed via separate input and output ports. Warm or cold liquid can be introduced into the jacket to heat or chill liquids or gases present in the inner vessel. In typical embodiments, the input to the jacket of column 211a receives fluid output from the jacket of the heat exchanger 203. The jacket of column 211a thus receives spent heating fluid from the heat exchanger 203. The jackets for downstream columns can be similarly provided with spent heating fluid from any one or more upstream jacketed columns or the initial heat exchanger 203. This technique advantageously reduces energy use as the heat present in spent heating fluid can be used to warm downstream components.

Jacketed columns suitable for use with the described techniques and system are described in detail in U.S. Pat. No. 10,315,130, issued Jun. 11, 2019, entitled "PHYTOCHEMICAL EXTRACTION SYSTEMS, METHODS, AND DEVICES," the contents of which are incorporated by reference herein. Although jacketed columns are used in typical embodiments, other types of heat exchanging devices can be used.

The heated mixture of gases passes from the jacketed column 211a to the heat exchanger 212a, which chills the received mixture to temperature T, where T is less than the boiling point of gas S1 (T1) but greater than the boiling point of gas S2 (T2). Gas S1 condenses into liquid form and is recovered at a recovery port of stage C1. Gas S2 remains in gaseous form and passes to recovery stage C2.

The recovery stage C2 is configured similarly to stage C1. Stage C2 includes a jacketed column 211b and a heat exchanger 212b. The jacketed column 211b heats the gas S2 to prevent reflux as discussed above. The heated gas S2 passes to the heat exchanger 212b, which chills the received gas to temperature T, where T is less than the boiling point of gas S2. Gas S2 condenses into liquid form and is recovered at a recovery port of stage C2. If there are any remaining components of the mixture, these can be further processed downstream by using additional recovery stages, captured for later use, or alternatively vented to the environment.

The described system may also include an optional compressor 204 between or within one or more of the stages. A compressor advantageously raises the boiling points of the gases, which means the entire system can be run at higher temperatures, thus saving on refrigeration costs. The preferred placement of the compressor is within recovery stage C1, after the output of the jacketed column 211a and before the input of the heat exchanger 212a. In some embodiments, the compressor (or an additional compressor is placed within recovery stage C2.

Figure 3:
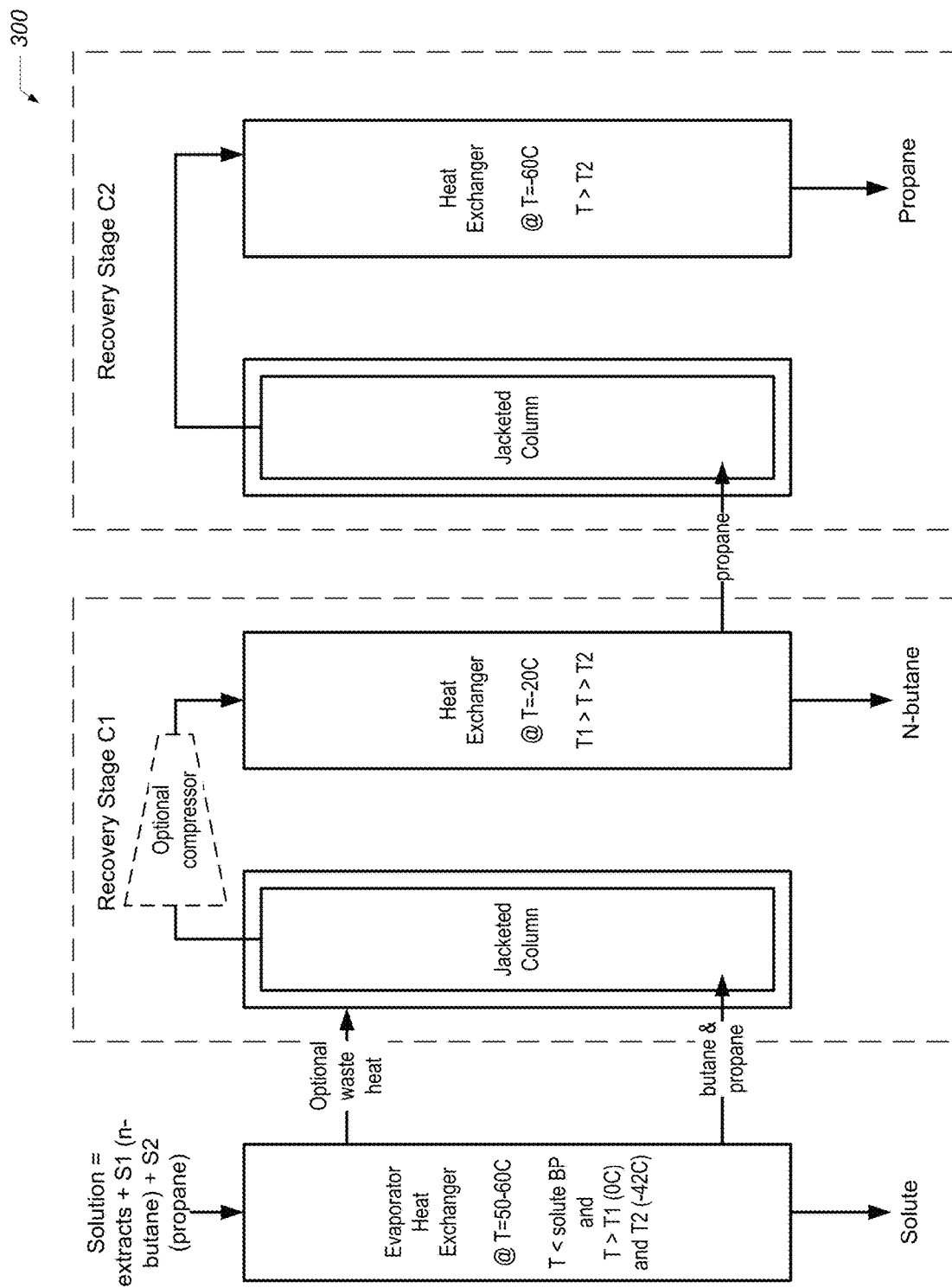
FIG. 3 is a diagram that illustrates an example separation system configured to separate a solution comprising a solute of one or more cannabis extracts and a solvent mixture of propane and n-butane.

FIG. 3 is a diagram that illustrates an example separation system 300 configured to separate a solution comprising a solute of one or more cannabis extracts and a compressed-gas solvent mixture of propane and n-butane. Such an embodiment can be used to separate the components of a hydrocarbon-based phytochemical extraction process. For example, mixtures of n-butane, isobutane, and/or propane may be used to extract desirable compounds from cannabis. A typical extraction process washes the cannabis in a mixture of liquid n-butane and propane, resulting in a solution comprising the compressed-gas solvents as well as dissolved cannabis compounds (the solute). At 1 atmosphere, N-butane has a boiling point of about 0 C; propane has a boiling point of about −42 C; and isobutane has a boiling point of about −12 C.

As shown in FIG. 3, given an extraction process that uses n-butane and propane, the system 300 may be used to separate the solute and the compressed-gas solvents used in the extraction process. The solution resulting from the extraction process is initially introduced into a tube and shell heat exchanger in the solute recovery stage. This heat exchanger serves as an evaporator. It runs hot enough to boil all the compressed-gas solvents in the mixture. The temperature of the heat exchanger is less than the boiling point of the solute but greater than the highest boiling point in the mixture. In a typical application where the mixture of compressed-gas solvents is n-butane and propane, the temperature is 40-50 C. The compressed-gas solvents boil and pass into the first recovery stage (C1) while the solute is recovered from the heat exchanger.

The gases pass into a jacketed column of C1 that runs at a temperature above the boiling point of the n-butane, or above 0 C. This jacketed column prevents reflux as discussed above. The mixture of gases passes from the jacketed column into a tube and shell heat exchanger that chills the mixture, running at or below the highest boiling point of the gases in the mixture. In general, the temperature of a heat exchanger in a recovery stage is 10-20 C lower than the boiling point of the gas to be separated at a given stage, but always higher than the highest boiling point of the remaining gases in the mixture. In an application to separate n-butane (boiling point of about 0 C at 1 atm) and propane (boiling point of about −42 C at 1 atm), the heat exchanger typically runs at about −20 C. The heat exchanger causes the n-butane to condense so that it can be recovered in liquid form. The remaining gas (propane) passes to the second recovery stage C2.

As discussed above, stage C2 is configured similarly to stage C1. Gas passes into a jacketed column, which heats the gas to prevent reflux. The gas then passes into a heat exchanger that chills and condenses the gas for recovery. In a typical application to separate n-butane and propane (boiling point of about −42 C at 1 atm), the heat exchanger runs at about −60 C.

Of course, further stages can be added, one stage per gas being separated, so long as the boiling points of the gases are sufficiently distinct. The entire system is iso-baric, meaning that is runs at approximately the same pressure throughout. More particularly, the pressure within the system is a function of the vapor pressure of the compressed gas having the lowest boiling point at the temperature at which that gas is being chilled. For example, for propane at −50 C, this would be about 1 atm.

Figure 5A:
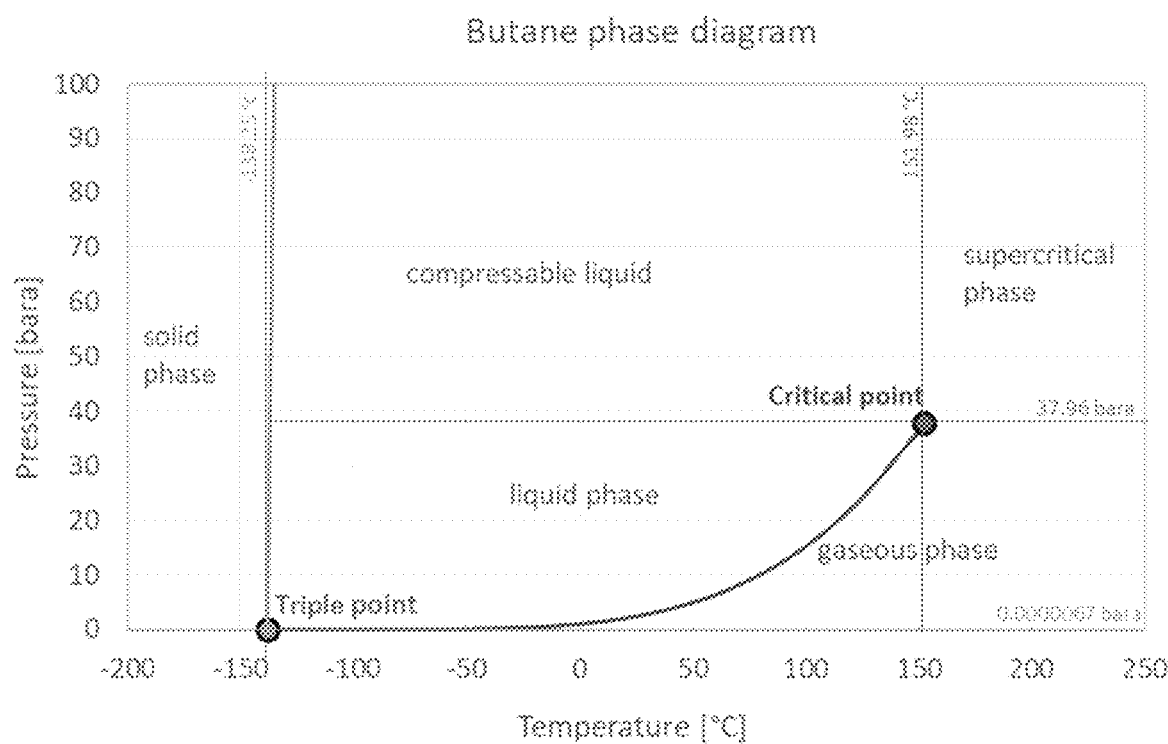
FIGS. 5A and 5B are phase diagrams for butane and propane, respectively.
Figure 5B:
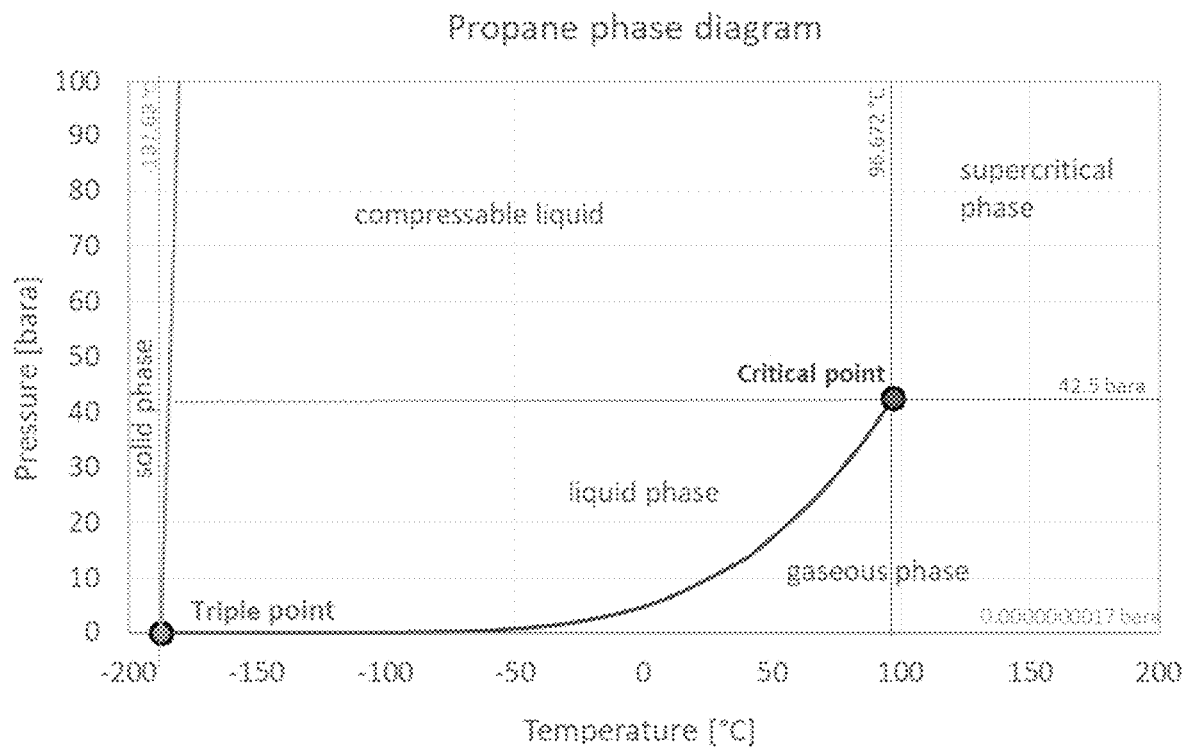

It is possible to run the system at approximately constant pressure throughout by setting appropriate temperatures at each recovery stage as discussed above. Conversely, it is possible to run the system at approximately constant temperature throughout by the use of compressors within or between one or more recovery stages. If the pressure of a stage is adjusted (increased) the gas will condense at a higher temperature. This relationship between pressure and temperature within the system can be understood with reference to phase diagrams. FIGS. 5A and 5B are phase diagrams for butane and propane respectively. In the case of a butane/propane mix that is commonly used in cannabis extraction, establishing a pressure of about 3.5 atm in the propane recovery stage would allow the heat exchanger in that stage to run at about 0 C, or about the same as the boiling point of butane.

The use of different types of heat exchangers is also contemplated, in order to increase efficiency and/or reduce cost of the system. For example, a typical butane/propane mix in cannabis extraction is 70% butane and 30% propane. One configuration uses a tube and shell heat exchanger in the butane recovery stage and a tube in tube heat exchanger in the propane recovery stage. The tube and shell heat exchanger provides high surface area optimized for bulk recovery of the butane, while the tube in tube heat exchanger is a less expensive yet effective device for recovering the relatively smaller quantity of propane.

Figure 4A:
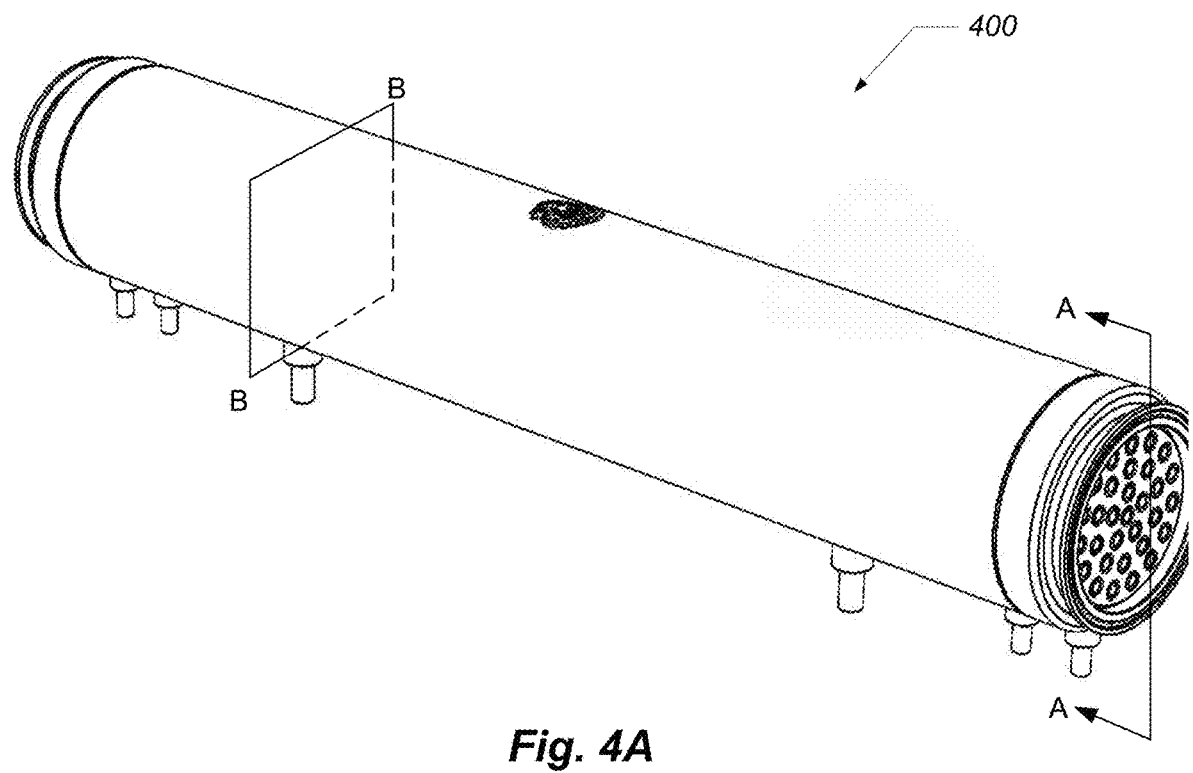
FIGS. 4A-4D are views of a heat exchanger employed in an example embodiment.
Figure 4B:
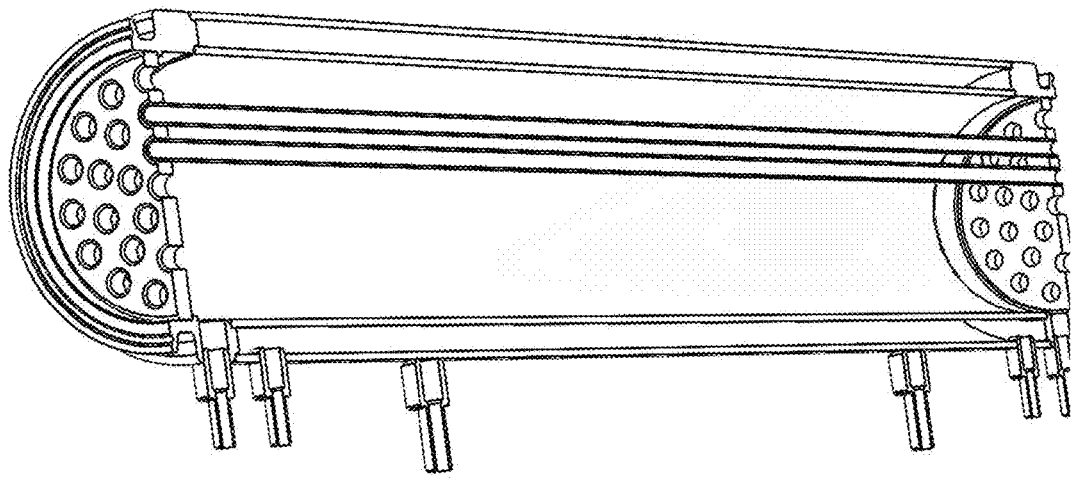
Figure 4C:
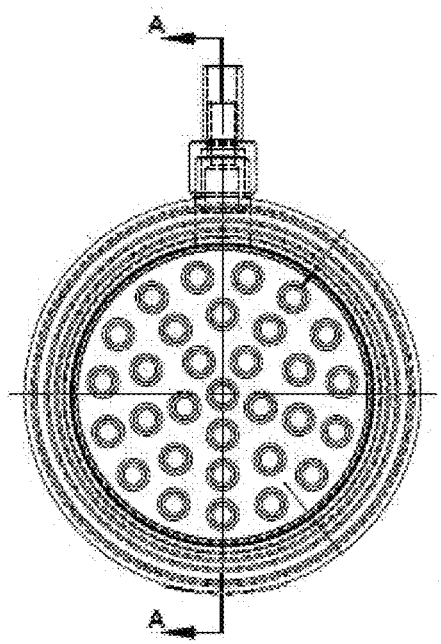
Figure 4D:
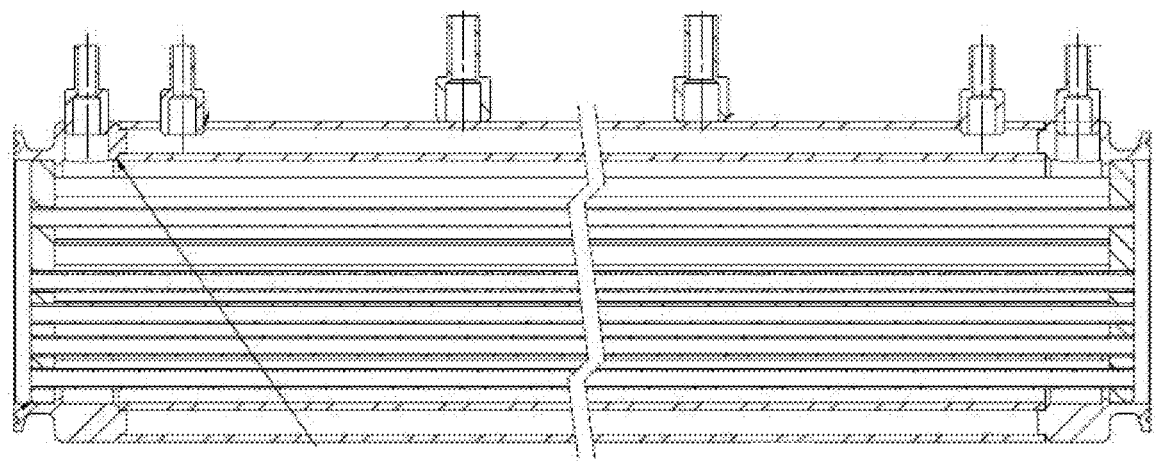

FIGS. 4A-4D are views of a heat exchanger used in an example embodiment. FIG. 4A is an isometric view of an example tube and shell heat exchanger 300. FIG. 4B is an isometric cross-sectional view of the heat exchanger 300, taken along cross section A shown in FIG. 4A. FIG. 4C is top plan cross sectional view of the heat exchanger 300, taken along cross section B shown in FIG. 4A. FIG. 4D is an elevational cross-sectional view of the heat exchanger 300, taken along cross section A shown in FIG. 4A.

In general, the described system advantageously reduces energy use and corresponding costs. In particular, the system uses a chilling temperature at each stage that closely matches the boiling point of the specific gas being condensed and recovered at that stage. An alternative approach to recover gases runs a single condenser (e.g., heat exchanger) at the lowest boiling point of the gases in the mixture. In the case of a mixture of n-butane (boiling point of 0 C) and propane (boiling point of −40 C), the condenser would have to run at or below −40 C. This alternative approach is deficient compared to the described inventive system for at least two reasons. First, the alternative approach requires significantly more refrigeration resources than running a first heat exchanger at around −10 C (to recover n-butane) and a second heat exchanger at around −50 C (to recover propane). Second, the alternative approach recovers the gases in mixture, and thus does not have the ability to separate the gases.

While embodiments of the invention have been illustrated and described, as noted above, many changes can be made without departing from the spirit and scope of the invention. Accordingly, the scope of the invention is not limited by the above disclosure.

The invention claimed is:

1. A system for separating a mixture of compressed gases, the system comprising:

a first recovery stage comprising a heat exchanger including a first input port, a first output port, and a recovery port, wherein the heat exchanger is configured to:
  receive via the first input port the mixture of gases in gaseous form;
  establish a temperature that is below the boiling point of a first one of the gases but above the boiling points of all of the remaining gases thereby converting the first one of the gases into liquid form while allowing the remaining gases to remain in gaseous form;
  provide the remaining gases via the first output port; and
  provide the first gas in liquid form via the recovery port;
one or more additional recovery stages each having a heat exchanger, wherein each one of the additional recovery stages is configured to:
  receive one or more gases in gaseous form from a prior recovery stage;
  establish a temperature below the boiling point of the received gas that has the highest boiling point of all of the received gases, wherein the established temperature is above the boiling points of all other of the received gases, thereby converting the gas having the highest boiling point into liquid form while allowing the remaining gases to remain in gaseous form;
  provide the remaining gases to a next recovery stage; and
  provide the gas having the highest boiling point in liquid form via a recovery port; and
a solute recovery stage comprising a heat exchanger including a second input port, a second output port, and a recovery port, wherein the heat exchanger is configured to:
  receive via the second input port a solution comprising the mixture of compressed-gas solvents and a solute in liquid form;
  apply heat to convert the mixture of compressed gases into gaseous form, while retaining the solute in liquid form;
  provide via the second output port to the first recovery stage the mixture of gases in gaseous form; and
  provide the solute via the recovery port,
wherein the heat exchanger of the first recovery stage runs at −10 to −20 C to recover n-butane, and wherein the heat exchanger of one of the additional recovery stages runs at −50 to −60 C to recover propane,
wherein the first recovery stage includes a jacketed column that includes an input port and an output port, wherein the jacketed column is configured to receive via its input port the mixture of gases in gaseous form, apply heat to the gases, and provide the heated gases to the heat exchanger via its output port,
wherein the heat exchanger of the solute recovery stage is configured to:
  receive liquid having a temperature greater than the boiling points of all of the gases;
  transfer heat from the received liquid to the mixture of gases; and
  provide the liquid after heat transfer to the jacketed column of the first recovery stage, thereby heating the first one of the gases using waste heat from the solute recovery stage, and
wherein the jacketed column includes an inner vessel surrounded by an outer vessel that forms a jacket around the inner vessel, and wherein the liquid after heat transfer is received from the heat exchanger of the solute recovery stage and introduced into the jacket, thereby heating the first one of the gases using waste heat in spent heating fluid received from the heat exchanger of the solute recovery stage.

2. The system of claim 1, wherein the solution comprises a solute resulting from a phytochemical extraction process, wherein the solute includes one or more cannabinoids extracted from source plant material, wherein the gases include n-butane and propane.

3. The system of claim 1,
wherein the first recovery stage includes a jacketed column that includes a third input port and a third output port, wherein the jacketed column is configured to receive via the third input port the mixture of gases in gaseous form, apply heat to the gases, and provide the heated gases to the heat exchanger via the third output port, and further comprising:
a compressor having a fourth input port fluidly coupled to the third output port and a fourth output port fluidly coupled to the first input port, such that pressure within the heat exchanger is higher than the pressure within the jacketed column, thereby raising the boiling point of the first gas.

4. The system of claim 1,
wherein the first recovery stage includes a jacketed column that includes an input port and an output port, wherein the jacketed column is configured to receive via its input port the mixture of gases in gaseous form, apply heat to the gases, and provide the heated gases to the heat exchanger via its output port,
wherein the output port of the jacketed column is directly fluidly coupled to the input port of the heat exchanger of the first recovery stage.

5. The system of claim 1, wherein the heat exchanger is a shell and tube heat exchanger.

6. The system of claim 1, wherein the established temperature of each of the recovery stages is 10-20 C below the boiling point of the corresponding gas being recovered at each stage.

7. The system of claim 1, wherein the system is isobaric, maintaining an internal pressure of about 1 atm.

\* \* \* \* \*